United States Patent Office 3,364,106
Patented Jan. 16, 1968

3,364,106
5 - TERT - BUTYL - 2 - CHLOROPHENYL N-METHYLCARBAMATE AND ITS USE AS AN INSECTICIDE
Warren W. Kaeding, Concord, Calif., assignor to The Dow Chemical Company, Midland, Mich., a corporation of Delaware
No Drawing. Filed Jan. 30, 1963, Ser. No. 255,094
2 Claims. (Cl. 167—30)

The present invention is concerned with organic chemistry and is particularly directed to the 5-tert-butyl-2-chlorophenyl ester of N-methylcarbamic acid. The present compound is of the formula

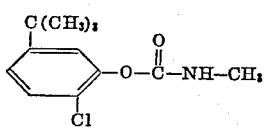

The present compound is a white granular solid melting at 120°–122° C., of very low solubility in water but readily soluble in acetone. The compound is useful as an insecticide and as an arachnicide, for the control of beetles, such as the confused flour beetle and the Mexican bean beetle; American Cockroach; aphids, such as the Bean aphid; Two-spotted spider mite; Southern army worm; House fly; and numerous other insects and arachnids. The compound is also useful as a rodenticide, and as a herbicide.

The present compound is readily prepared by causing a reaction between 5 - tert - butyl - 2 - chlorophenol and methylisocyanate. The reaction is caused by contacting the reactants together. It goes forward at an advantageous rate in the presence of a small, non-critical catalytic amount of triethylamine. The reaction is exothermic and proceeds satisfactorily at room temperatures, preparing the present product in low yields almost at once, but with standing, produces substantially higher yields. Advantageously, the reaction is carried out in an inert liquid reaction medium, such as a mixture of hydrocarbons and chlorinated hydrocarbons. Typically, the desired product compound is insoluble in a substance which is a solvent for all starting materials; progress of the reaction can thus be observed as progress in the formation of a granular deposit from solution.

The duration of reaction at room temperature is a matter of choice, and will be governed in part by the degree to which it is desired the reaction go to completion. The reaction goes virtually to stoichiometric completion after from about 50 to about 200 hours, such as 150 hours. At the end of this time, granular product deposited from solution can readily be separated by filtration and air dried. Alternatively, solvent and unreacted excess methylisocyanate can be separated from the product by evaporation under subatmospheric pressure. If desired, the granular product can be washed with further portions of such liquid as was used as reaction solvent or the like, which will serve as wash solvent for impurities but leave the desired product largely unaffected.

The product as thus prepared can be simply separated and manifests the useful properties of the present invention; when it is desired that the product be obtained in purer form, purification can readily be carried out by recrystallization from solvent.

When it is desired to obtain substantially higher yields without the necessity of permitting the reaction mixture to stand for an extended period of time, the reaction between the 5-tert-butyl-2-chlorophenol and the methylisocyanate can be caused to take place at temperatures in excess of room temperature, such as, for example, 35° to 65° C., and preferably 50° to 60° C. Operations under such temperatures, and the necessary precautions attendant therewith, are known by those skilled in the art.

In a specific embodiment 19.0 grams of 5-tert-butyl-2-chlorophenol (0.1 mole) are dispersed in 50 milliliters of methylene chloride at room temperature, approximately 25° C. Thereto is added a few drops of triethylamine as catalyst, and 6.4 grams (0.11 mole) of methylisocyanate. The resulting solution is well shaken and set aside and permitted to stand at room temperature for approximately 7 days to carry the reaction to completion. During this time crystals separate from and deposit in the liquid solution; the solvent and excess methylisocyanate are pumped off from the resulting solution with an aspirator to recover the 5-tert-butyl-2-chlorophenyl methylcarbamate product as a solid. The product solid is thereafter recrystallized from hexane and is found to melt at 120°–122° C.

The present compound was found to be strongly insecticidal when employed in known techniques for the control of any of a wide variety of insect species. For example, a composition comprising 5-tert-butyl-2-chlorophenyl methylcarbamate as sole active ingredient, in an amount of 100 parts per million by weight of ultimate composition, was employed as a contact pesticide for the control of *Amblyomma americanum* (lone star tick), and was found to give a 100 percent control of the treated tick organisms.

The starting phenol compound employed in the preparation of the present invention is readily prepared by the chlorination of m-tert-butylphenol. For example, the reaction of m-tert-butylphenol with a moderate excess of gaseous chlorine, with carbon tetrachloride as inert liquid reaction medium, obtains the presently desired 5-tert-butyl-2-chlorophenol in admixture with other chlorinated m-tert-butylphenols. Conveniently, the reaction takes place at room temperatures, or at temperatures slightly in excess of room temperature, such as from 30° to 40° C., and goes to essential completion within a period of several hours. The presently desired product can be separated from the mixture by fractional distillation. It boils at about 115° C. at 5 millimeters.

The chemically pure starting phenol from which the present compound is prepared may be disadvantageously expensive whereas an industrially pure product may be quite economical. Synthesis of the present compound from the partially purified phenol gives the present product together with the related carbamates that would be expected from the position isomer impurities in the starting phenol. Such product, essentially an impure form of the present compound, possesses the advantages of the present invention in proportion to the concentration of the compound of the present invention, and, if desired, may be used without purification.

I claim:
1. 5-tert-butyl-2-chlorophenyl methylcarbamate.
2. The method of killing insects which comprises contacting insects and their habitats with a composition containing 5-tert-butyl-2-chlorophenyl methylcarbamate.

References Cited
UNITED STATES PATENTS
3,062,707  11/1962  Kohn et al. _____ 260—479
3,076,741   2/1963  Kohn et al. _____ 260—479

LORRAINE A. WEINBERGER, *Primary Examiner.*

LEON ZITVER, *Examiner.*

I. R. PELLMAN, M. G. BERGER, *Assistant Examiners.*